(12) United States Patent
Raad

(10) Patent No.: US 6,824,326 B2
(45) Date of Patent: Nov. 30, 2004

(54) CONSTRUCTION MATERIALS PRODUCTS AND SOIL STABILIZATION USING VEGETABLE OIL AND METHOD OF PRODUCING THE SAME

(75) Inventor: Lutfi Raad, Fairbanks, AK (US)

(73) Assignee: University of Alaska Fairbanks, Fairbanks, AK (US)

( * ) Notice: Subject to any disclaimer, the term of this patent is extended or adjusted under 35 U.S.C. 154(b) by 482 days.

(21) Appl. No.: 09/823,857

(22) Filed: Mar. 30, 2001

(65) Prior Publication Data

US 2002/0026884 A1 Mar. 7, 2002

Related U.S. Application Data

(60) Provisional application No. 60/193,584, filed on Mar. 30, 2000.

(51) Int. Cl.$^7$ .............................. E02B 3/04; B05D 5/10; E01C 5/12; B29B 11/14; B29B 11/16
(52) U.S. Cl. ........................ 405/15; 427/138; 427/139; 523/132; 264/109; 264/122
(58) Field of Search ............................ 405/15; 427/138, 427/139; 523/132; 264/122, 109–128

(56) References Cited

U.S. PATENT DOCUMENTS

| | | | |
|---|---|---|---|
| 4,047,967 A | | 9/1977 | Majidzadeh et al. |
| 4,102,694 A | * | 7/1978 | Sasaki et al. ................. 501/99 |
| 4,169,736 A | | 10/1979 | Nielsen |
| 4,331,622 A | * | 5/1982 | Doi et al. .................. 264/45.3 |
| 4,618,369 A | | 10/1986 | Smith-Johannsen |
| 5,271,767 A | | 12/1993 | Light, Sr. et al. |
| 5,498,384 A | * | 3/1996 | Volk et al. .................. 264/122 |
| 6,260,326 B1 | * | 7/2001 | Muller-Hartburg ........... 52/601 |

* cited by examiner

Primary Examiner—Stephen J. Lechert, Jr.
(74) Attorney, Agent, or Firm—Christensen O'Connor Johnson Kindness PLLC

(57) ABSTRACT

A composition including a vegetable oil and a structural material selected from a group comprising soil, sand, bitumen, asphalt, and concrete. The polymerized vegetable oil being substantially within a range of 2%–20% by weight of the structural material.

41 Claims, No Drawings

CONSTRUCTION MATERIALS PRODUCTS AND SOIL STABILIZATION USING VEGETABLE OIL AND METHOD OF PRODUCING THE SAME

CROSS-REFERENCE TO RELATED APPLICATION

This application claims the benefit from U.S. Provisional Patent Application Ser. No. 60/193,584 filed Mar. 30, 2000, the disclosure of which is hereby expressly incorporated by reference.

FIELD OF THE INVENTION

The present invention relates generally to construction materials and, more particularly, to the use of vegetable oil to create construction materials, such as building stone, stabilized soils, and improved soil-aggregate-bitumen mixes.

BACKGROUND OF THE INVENTION

Modern society depends upon many environmentally hazardous products and processes. For example, the manufacture of modern construction materials may be destructive to natural habitats. Furthermore, construction materials are often manufactured from nonrenewable resources. However, environmental hazards exist beyond our dependency upon nonrenewable resources. Many of our most basic needs, such as food preparation, create environmentally hazardous byproducts. For example, under the Clean Water Act as amended by the Oil Pollution Act of 1990, disposal of vegetable oil carries many of the same risks to surface and ground water as petroleum. Despite the aforementioned problems, modern living requires the consumption of enormous quantities of both construction materials and vegetable oil.

Two of the most common materials used in construction and soil stabilization are bitumen and cement. Since about 3000 BC, bitumen mixtures have been used to seal cracks between stones in water reservoirs. For nearly as long, bitumen mixtures were used in the Middle East to pave roads. While bitumen can be found in nature, most bitumen is derived from petroleum. Asphalt, a common bitumen mixture generally used for paving, is composed primarily of hydrogen and carbon compounds and smaller quantities of nitrogen, sulfur, and oxygen. Furthermore aggregates, chemically inert particulate substances such as sand and gravel, are often added to asphalt. Bitumen in the form of asphalt emulsion is also sprayed over unsurfaced roads for dust control.

Concrete is a very common construction material. It is a mixture of aggregates, cement, and water. Cement is a finely ground powder that becomes solid when mixed with water through a process known as hydration. Hydration is the chemical combination of cement compounds and water to form submicroscopic crystals. Because of hydrating properties, constructional cements are often called hydraulic cements. Portland cement is a common hydraulic cement. Hydraulic cements are mixed with sand and water and used abundantly as injection grouts to stabilize underground soil formations and contaminated soil deposits.

Portland cement primarily consists of lime (CaO), silica ($SiO_2$) and alumina ($Al_2O_3$). Each of these components must be quarried. After excavation, the quarried materials undergo four manufacturing stages: First, the raw materials are crushed. Second, the materials are blended. Third, the blended mixture is burned in a kiln from about 1,350° to 1,550° C. (2,460° to 2,820° F.). Lastly, the burned product is ground together with gypsum (to control the setting time of the cement).

Consequently, damage to the environment and energy expenditure involved in manufacturing both cement and asphalt is enormous.

Like asphalt and concrete, vegetable oil also endangers the environment. While the production of vegetable oil is not as environmentally destructive as the production of asphalt and concrete, the disposal of vegetable oil does present environmental problems. Because vegetable oil contaminates both ground and surface water, the EPA has included vegetable and other non-petroleum oils in Oil Pollution Act of 1990 amendment to the Clean Water Act. The hazards to the environment posed by vegetable oils include drowning waterfowl, killing fish, asphyxiating benthic life forms, and adversely affecting the aesthetic qualities of shorelines.

Because of the expense involved in disposing of used vegetable oil, industries producing waste vegetable oil have attempted to create uses for recycled vegetable oil. Currently, used vegetable oil can be added to animal feed, processed into lubricants, or manufactured into biodiesel. Despite these recycling efforts, according to the EPA (Report No. 530-R-97-015) in 1995, only five to ten percent of the total vegetable oil used was recycled.

Accordingly two needs exists. First, a need exists for construction and soil stabilization materials that are both less damaging to the environment and not dependent upon nonrenewable resources. Second, there exists a need to further exploit recycled vegetable oil.

SUMMARY OF THE INVENTION

In accordance with one embodiment to the present invention, a composition is provided. The composition includes a polymerized vegetable oil and a structural material. In certain embodiments of the present invention, the polymerized vegetable oil is substantially within a range of 2%–20%. In another embodiment, the composition includes a polymerized vegetable oil content that is substantially within a range of 3%–9% by weight of the structured material. In still yet another embodiment, the polymerized vegetable oil content is 5% by weight of the structural material.

In accordance with further aspects of this invention, the polymerized vegetable oil is a used vegetable oil. In yet other embodiments, the composition further includes a predetermined amount of a catalyst. In certain embodiments, the catalyst is a metallic catalyst. Other catalysts such as lime (CaO), flyash, and Portland cement are also within the scope of the present invention. In still yet other embodiments of the present invention, the polymerized vegetable oil is selected from a group that includes at least one of canola oil, soybean oil, sunflower oil, corn oil, rapeseed oil, palm oil, olive oil, and linseed oil.

In accordance with another embodiment of the present invention, a method for forming a structural composition includes mixing between 2% and 20% by weight polymerized vegetable oil with a structural material to create a composition. In one embodiment, a range of 3%–9% of polymerized vegetable oil is mixed with sand to create a composition. Certain embodiments also include heating the composition, compacting the composition, and curing the composition.

DETAILED DESCRIPTION OF THE PREFERRED EMBODIMENT

Certain embodiments of the present invention combine the need for environmentally friendly building materials with the need to exploit renewable binding agents, such as vegetable oil, to create and improve construction materials and also to use in soil stabilization applications. Such construction materials includes construction blocks, stabilized soil, and improved asphalt.

In construction blocks, vegetable oil is used to bind a structural material, such as a variety of soils, sand, silt, clay, gravel or a mixture of these, to form solid or semisolid materials. The resulting materials have many uses in construction and road building. Accordingly, building stones similar to concrete, brick, and other types of masonry may be fabricated. As a non-limiting example, a construction material, such as brick, within the scope of one embodiment of the present invention, is suitably a composition formed from a combination of sand and vegetable oil. As demonstrated below, the resulting brick has improved strength properties that satisfy and, in many cases, exceed current industrial standards for common masonry blocks without vegetable oil.

As noted above, and in accordance with another embodiment of the present invention, stabilized soils, such as those utilized in roadbeds, are also fabricated from a composition of polymerized vegetable oil and a structural material. In one non-limiting example, 5% by weight soybean oil is combined with sand at a predetermined temperature. The resulting composition is then spread over an area in which stabilized soil is desired and compacted in a manner well known in the art, thereby improving the strength and stiffness of the treated area.

In addition to the creation of new materials, in certain other embodiments of the present invention, vegetable oil is added to well known bitumen mixtures. Bitumen, for the purpose of this disclosure, refers to asphalt cement, asphalt emulsions, liquid asphalts, and polymer or rubber modified asphalt and their derivatives. Two non-limiting methods utilizing this type of oil have been developed to improve the strength of such well known bitumen mixtures. An example of each of the foregoing compositions, as well as a method of producing the same, are set forth in greater detail below.

Vegetable oil is capable of binding structural materials, such as sand, silt, clay, gravel, or a mixture of these because under certain conditions, vegetable oil will polymerize. Vegetable oil includes triacylglycerides composed mostly of monounsaturated and polyunsaturated fatty acid chains. These unsaturated chains may be thermally polymerized by a number of free-radical initialized processes. Three reactions that likely cause vegetable oil polymerization in certain embodiments of the present invention are described below.

First, a Diels-Alder reaction results in substantial intermolecular (and to a lesser degree intramolecular) cross-linking. Diels-Alder occurs when a conjugated diene (a diene is a molecule containing two carbon-carbon double bonds; a diene with alternating double and single bonds is said to be conjugated) is heated with a dieneophile (a compound with a carbon-carbon double or triple bond and an attached electron-withdrawing group) to create a cyclohexene ring. These rings can form between two polymer chains cross-linking the chains or between repeating monomer cyclohexene rings forming new polymer chains.

Second, cross-linking and branching of carbon chains can result from cross-linking by oxygen. Consequently, increasing the oxygen pressure will result in a greater degree of cross-linking.

Lastly, bonding could result from the interaction of silica in the soil and the three dimensional structure of the polymerized vegetable oil. Hydrogen bond formation between electronegative portions of the fatty acids and silanol groups on the silica surface plays an important role in silica incorporation. Because the exposed carboxylic acid group of the free fatty acids is more electronegative than carbon-carbon double bonds, silica incorporation may increase with higher percentages of free fatty acids. Although three possible reactions likely to cause the vegetable oil polymerization have been described above, it should be apparent that the invention is not intended to be limited by such reactions. Thus, the reactions are intended to be only illustrative, and non-limiting.

Vegetable oils capable of the above described polymerization can be derived from many sources. The amount of cross-linking and consequently the resulting material strength is directly related to the double-bond density of the fatty acid residues in the vegetable oil. Experiments conducted within the scope of certain embodiments of the present invention have shown that rapeseed oil, palm oil, linseed oil, olive oil, canola oil, sunflower, soybean, and corn oils polymerize and bind structural materials. However, because of the similarities between vegetable oils, it should be apparent that other vegetable oils are likely to yield similar results and, therefore, are also within the scope of the present invention. Also, any one or more of the vegetable oils may be mixed within another one of the vegetable oils. Therefore, a mixture of vegetable oil is also within the scope of the present invention.

Unprocessed recycled (used) vegetable oils are also within the scope of various embodiments of the present invention. Unprocessed recycled vegetable oil has been found to form strong bonds with structural materials at temperatures lower than unused vegetable oil (see Example I). One possible nonexclusive source of recycled vegetable oil is deep-fat fryer oil, such as the type typically used by fast food restaurants. Genetically or chemically altered oils, or vegetable oil derivatives including emulsions, are also within the scope of various embodiments of the present invention.

Factors other than the type of vegetable oil used will also affect the strength of the resultant material. Deriving a material with the desired properties may require compacting and, in some circumstances, heating the vegetable oil and structural material mixture. Resulting material strength can be maximized by maximizing compaction of the vegetable oil structural material mixture based upon the type of structural material and the amount of vegetable oil used.

Also, varying the type of the structural material (i.e., soil), temperature at which the components are mixed, sequence of mixing, duration of heating, duration of mixing, conditions (temperature and humidity) under which the mixture is cured, and duration of curing (see Table 2) may also affect other process parameters as well as the properties of the resulting material. Furthermore, catalysts can be used to promote the binding process. Such catalysts include metallic catalysts, such as zinc, nickel, zircanium, aluminum, titanium, copper ($Cu^{2+}$) and iron ($Fe^{3+}$). (See Example III.) Other catalysts such as lime (CaO), Portland cement, and flyash, could also be used and, therefore, are also within the scope of the present invention.

As non-limiting examples, a mixing time substantially between three minutes to 30 minutes is within the scope of certain embodiments of the present invention. As for sequence of mixing, the oil may be mixed directly with the structural material if no catalyst is used. If a catalyst is used, the catalyst may be added to the structural material first, then the oil is introduced and mixed. In some cases, depending on the catalyst type and medium used, the oil is conditioned first by adding to it the catalyst. The conditioned oil is then mixed with the structural material; mixing temperature ranges from room temperature at about 20° C. to 200° C.; curing temperatures could range from about 20° C. to about 400° C.; curing time could vary from less than an hour to about 96 hours for oven curing (i.e., temperatures greater than room temperature) and up to 18 weeks for curing at room temperature.

Therefore, the non-limiting examples disclosed are merely illustrative and will result in the materials described. Varying any of the aforementioned parameters may create materials with different properties and, therefore, it should be apparent that such materials are within the scope of the present invention.

EXAMPLE I

Construction Blocks

Construction blocks can be fabricated by first mixing between 2% and 20% by weight vegetable oil with dry sand at room temperature. Mixing should be continued until the soil particles are coated with oil and the mix has a homogeneous color. Although 2%–20% is preferred, other ranges, such as 3%–9%, are also within the scope of the present invention.

The mixture is then compacted into molds by conventional compaction to, as a non-limiting example, a density between 95 lb/cuft and 115 lb/cuft. The mixture is cured in the molds at a temperature substantially between 100° C. and 400° C. for a duration of 15 minutes to 12 hours depending on curing temperature. Higher temperatures require less curing time. The blocks are removed from the molds.

Table 1 contains the strength data for blocks made from a mixture of 5% by weight vegetable oil and sand mixed for 3 minutes to 5 minutes, compacted to a density between 111 lb/cuft and 114 lb/cuft, and cured at 230° C. for 12 hours.

TABLE 1

Strength data for blocks made from vegetable oil and sand.

| Oil Type Used | % Oil by Weight | Curing Time (Hours) | Strength (psi) |
|---|---|---|---|
| Soybean | 5 | 12 | 1365 |
| Soybean | 5 | 12 | 1727 |
| Canola | 5 | 12 | 1830 |
| Canola | 5 | 12 | 1522 |

Recycled Vegetable Oil

In another non-limiting experiment, construction blocks made from recycled (used) Canola oil were compared to blocks made from previously unused Canola oil. A mixture of 5% by weight Canola oil and sand was mixed for approximately three to five minutes, compacted to density of 104 lb/cuft to 108 lb/cuft, and cured at 200° C. for 4 hours. While the sample made from previously unused Canola oil exhibited an average strength of 1987 psi, the sample made from recycled Canola oil exhibited greater strength, such as 2531 psi.

Table 2 contains data concerning the effects of curing duration on the strength of construction blocks made from recycled oil. The data in Table 2 was derived from samples made from 5% by weight recycled oil mixed with sand for three minutes to five minutes at room temperature and compacted to densities between 107 lb/cuft and 108 lb/cuft. The mixture was then cured at 200° C. for the time periods listed.

TABLE 2

Effects of curing duration on the strength of construction blocks made from recycled canola oil

| Curing Time (Hours) | Strength (psi) |
|---|---|
| 1 | 412 |
| 1 | 580 |
| 2 | 1430 |
| 2 | 1537 |
| 4 | 2525 |
| 4 | 2537 |
| 6 | 1887 |
| 6 | 2200 |
| 10 | 2050 |
| 10 | 2137 |

EXAMPLE II

Soil Stabilization

Stabilized soils, such as a stabilized base in road construction, can be fabricated by mixing between 2% and 20% by weight vegetable oil with structural material and simultaneously heating the mixture to between 50° C. and 200° C. The mixture is then spread over the area in which stabilized soil is desired and compacted in a manner known in the art, such as by a compaction roller or tamp. The compacted mixture is permitted to cure.

The resulting material exhibits increased strength and stiffness over untreated sand. For a non-limiting example, specimens were prepared by mixing 5% by weight soybean oil with sand for 15 minutes at between 150° C. and 200° C. The specimens were then cured at room temperature (approximately 20° C.) for two to 18 weeks. Although a minimum of two weeks is specified, periods less that two weeks, such as one day, are also within the scope of the present invention. Table 3 below contains the resulting strength data for these specimens.

TABLE 3

Strength data for stabilized soils.

| Oil Type | % Oil by Weight | Curing Time (Weeks) | Strength (psi) |
|---|---|---|---|
| Soybean | 5 | 2 | 43 |
| Soybean | 5 | 2 | 44 |
| Soybean | 5 | 2 | 45 |
| Soybean | 5 | 7 | 39 |
| Soybean | 5 | 7 | 44 |
| Soybean | 5 | 7 | 29 |
| Soybean | 5 | 10 | 46 |
| Soybean | 5 | 10 | 45 |
| Soybean | 5 | 12 | 46 |
| Soybean | 5 | 15 | 85 |
| Soybean | 5 | 16 | 60 |
| Soybean | 5 | 16 | 57 |
| Soybean | 5 | 18 | 69 |
| Soybean | 5 | 18 | 42 |

Another non-limiting experiment tested the effect of the type of vegetable oil used on the strength of the stabilized soil. Specimens were prepared by mixing 5% by weight of either soybean, sunflower, or corn oil with sand for 15 minutes at a temperature between 150° C. and 200° C. The specimens were then cured at room temperature (approximately 20° C.) for four weeks. Table 4 below contains the resulting strength data for the specimens.

TABLE 4

Effect of the type of oil used on vegetable oil stabilized soils

| Oil Type | % Oil by Weight | Curing Time (Weeks) | Strength (psi) |
|---|---|---|---|
| Soybean | 5 | 4 | 49 |
| Soybean | 5 | 4 | 43 |
| Soybean | 5 | 4 | 47 |
| Sunflower | 5 | 4 | 73 |
| Sunflower | 5 | 4 | 64 |
| Sunflower | 5 | 4 | 82 |
| Corn | 5 | 4 | 36 |
| Corn | 5 | 4 | 33 |
| Corn | 5 | 4 | 29 |

Durability

A third non-limiting experiment tested the resilience of the vegetable oil stabilized soil against freeze-thaw cycles (see Table 4). Freeze-thaw cycle testing involves soaking the specimens in water at room temperature (approximately 20° C.) for 24 hours. The specimens are then removed from the water bath and frozen at 0° C. for 24 hours. The sample is thawed in the same water bath for 24 hours. These steps are then repeated for a desired number of cycles such as one to 12 cycles.

This experiment involved the testing of specimens prepared by mixing 5% by weight of soybean oil with sand for 15 minutes at a temperature ranging between 150° C. and 200° C. The specimens were compacted to a density between 106 lb/cuft and 110 lb/cuft then cured at room temperature (approximately 20° C.) for 4 weeks. Table 5 below contains the resulting strength data for the specimens.

TABLE 5

Freeze-thaw cycle test results on vegetable oil stabilized soils.

| Oil Type | % Oil by Weight | Curing Time (Weeks) | Freeze-Thaw Cycles | Strength (psi) |
|---|---|---|---|---|
| Soybean | 5 | 4 | 1 | 29 |
| Soybean | 5 | 4 | 1 | 29 |
| Soybean | 5 | 4 | 1 | 31 |
| Soybean | 5 | 4 | 3 | 36 |
| Soybean | 5 | 4 | 3 | 39 |
| Soybean | 5 | 4 | 3 | 35 |
| Soybean | 5 | 4 | 6 | 33 |
| Soybean | 5 | 4 | 6 | 36 |
| Soybean | 5 | 4 | 6 | 35 |
| Soybean | 5 | 4 | 12 | 33 |
| Soybean | 5 | 4 | 12 | 37 |

During the freeze-thaw cycle testing, no vegetable oil residue was observed floating on the water bath, thereby indicating that no leaching of vegetable oil was observed and therefore contamination associated with leaching is not a problem.

EXAMPLE III

The Use of Catalysts

Experiments within the scope of certain embodiments of the present invention have shown that the temperature necessary to initiate polymerization of the vegetable oil can be reduced by the addition of catalysts. Both metallic catalysts, such as copper, iron, zinc, nickel, zirconium, aluminum, and titanium, and non-metallic catalysts, such as lime, flyash, and Portland cement, are within the scope of the invention.

Differential scanning calorimeter data suggests that soybean oil begins thermal polymerization at approximately 230° C. However, when metallic catalysts are added, thermal polymerization begins at approximately 100° C. and optimum cross-linking temperature is reached at 160° C. As a non-limiting example, a range of catalyst content is substantially between 1% to 5% by weight of the structural material. The range depends on the medium used to prepare the catalyst, known as the catalyst medium. As an example, hydrochloric acid (HCL) or other organic acids may be used to prepare solutions that have copper and iron. These solutions could have different concentrations of acid. Thus, the amount of catalyst added depends on the catalyst medium. It also depends on the kind of vegetable oil used, percent of vegetable oil, and type of soil.

EXAMPLE IV

Bitumen Mixture Additive

The strength and stiffness of bitumen mixtures can be improved by first conditioning the mixture with vegetable oil. Mixing vegetable oil with structural materials, such as sand or a mixture of gravel and sand that will satisfy the standard gradation used in traditional asphalt concrete aggregates, at between 150° C. and 200° C. for about 20 minutes. The use of catalysts similar to those in Example III would improve the polymerization reaction between the vegetable oil and the structural material and may also result in reduced mixing temperature and time requirements. Next, the preconditioned structural material is then added to the bitumen to create a bitumen-structural material mixture. The bitumen-structural material mixture is then applied to the desired surface in the same manner as bitumen mixtures that do not contain vegetable oil preconditioned structural material.

Aggregate (i.e., structural material) is generally a mixture of sand and gravel that sometimes includes traces of silt and clay. As noted above, a bitumen refers to asphalt cement, asphalt emissions, liquid asphalts, and polymer or rubber modified asphalt and their derivatives. The vegetable oil could be one of the oils listed above, or a mixture of several oils. Used vegetable oil could be one type, or a mixture of many different used vegetable oils.

The vegetable oil is mixed with the bitumen at temperatures ranging from ambient temperature of less than 20° C. to temperatures as high as 230° C. The amount of vegetable oil used varies and depends on the consistency, workability, viscosity, strength and stiffness desired. As a non-limiting example, the range of vegetable oil is substantially between 2%–12% by weight of the bitumen.

The bitumen-oil mix is then added and mixed with aggregates (or other structural material) until the mixture is homogenous, whereby the aggregates are coated with the bitumen. Determination of mixing temperature follows conventional criteria for mixing bitumen with aggregates. The amount of bitumen-oil mixed with the aggregates varies and depends on the strength and stiffness desired for the final product.

The amount of bitumen-oil mixed with the aggregates could be determined from the standard methods for mix design used in conventional technology for bitumen-aggregate mixes. The bitumen-oil-aggregate mix is then compacted and placed using conventional methods. Compaction temperature of the bitumen-oil-aggregate mix is determined using conventional criteria for compacting bitumen-aggregate mixes.

EXAMPLE V

Bitumen Mixture Modifier

Vegetable oil can also be mixed with the bitumen (rubberized asphalt or polymer modified asphalt could also be used) at an elevated temperature to act as a bitumen modifier. The vegetable oil is mixed with the bitumen-structural materials soil-aggregate mixture when the mixture is in its liquid and heated state. Catalysts, similar to those in Example III, could be added to enhance the polymerization reaction. Then the vegetable oil modified bitumen-structural materials mixture is applied to the desired surface in the same manner as bitumen mixtures that do not contain vegetable oil. The resulting modified bitumen has improved strength, stiffness, and temperature susceptibility.

An exemplary method of obtaining the modified bitumen includes mixing the vegetable oil with the aggregate, where the vegetable oil is substantially within a range of 2%–12% by weight of dry aggregate. The temperature range for mixing the vegetable oil with aggregates varies from substantially between 50° C. to 300° C. A catalyst could be used with the vegetable oil-aggregate mixture. The vegetable oil-aggregate mixture is then mixed with the bitumen until it is a homogenous mixture, whereby the aggregates are substantially coated with the bitumen. Determination of mixing temperature follows conventional criteria for mixing bitumen with aggregates.

The amount of bitumen mixed with the vegetable oil-aggregate mix varies and depends upon the strength and stiffness desired for the final product. The amount of bitumen mixed with the vegetable oil-aggregate mix could also be determined from standard methods for mix design used in conventional technology for bitumen-aggregate mixes.

The vegetable oil-aggregate-bitumen mix is then compacted and placed using conventional methods. Compaction temperature of the vegetable oil-aggregate-bitumen mix is determined using conventional criteria for compacting bitumen-aggregate mixes.

The application of the proposed process is not limited to the above examples. The proposed methodology could be applied to obtain a wide range of materials with varying degree of property improvement depending on the intended use of the material and/or the degree of soil improvement required.

While the preferred embodiment of the invention has been illustrated and described, it will be appreciated that various changes can be made therein without departing from the spirit and scope of the invention.

What is claimed is:

1. A load bearing composition, comprising:
   (a) a polymerized vegetable oil; and
   (b) a structural material, wherein the vegetable oil is substantially within a range of 4%–20% by weight of the structural material.

2. The load bearing composition of claim 1, wherein the vegetable oil is substantially within a range of 4%–9% by weight of the structural material.

3. The load bearing composition of claim 1, wherein the vegetable oil is substantially 5% by weight of the structural material.

4. The load bearing composition of claim 1, wherein the structural material is at least one of silt, clay, gravel, soil, sand, bitumen, and concrete.

5. The load bearing composition of claim 1, wherein the vegetable oil is used vegetable oil.

6. The load bearing composition of claim 1, further comprising a predetermined amount of a catalyst.

7. The load bearing composition of claim 6, wherein the catalyst is a metallic catalyst selected from the group consisting of zinc, copper, iron, nickel, zirconium, aluminum, and titanium.

8. The load bearing composition of claim 6, wherein the catalyst is selected from the group consisting of lime, flyash, and Portland cement.

9. The load bearing composition of claim 1, wherein the vegetable oil is at least one of rapeseed oil, palm oil, linseed oil, canola oil, soybean oil, olive oil, sunflower oil, and corn oil.

10. The load bearing composition of claim 1, wherein the composition is a building material.

11. A method for forming a structural composition, comprising:
    (a) mixing a structural material with a vegetable oil to create a composition, wherein the vegetable oil is substantially within a range of 2% and 20% by weight of the structural material;
    (b) compacting the composition; and
    (c) curing the composition.

12. The method of claim 11, wherein the vegetable oil is substantially within a range of 3%–9% by weight of the structural material.

13. The method of claim 11, wherein the vegetable oil is substantially 5% by weight of the structural material.

14. The method of claim 11, wherein the vegetable oil is at least one of rapeseed oil, palm oil, linseed oil, canola oil, soybean oil, sunflower oil, olive oil, and corn oil.

15. The method of claim 11, wherein the vegetable oil is selected from consisting of a used vegetable oil and a mixture of used vegetable oils.

16. The method of claim 11, further comprising adding a predetermined amount of a catalyst.

17. The method of claim 16, wherein the catalyst is a metallic catalyst selected from the group consisting of zinc, copper, iron, nickel, zirconium, aluminum, and titanium.

18. The method of claim 16, wherein the catalyst is selected from the group consisting of lime, flyash, and Portland cement.

19. The method of claim 11, further comprising pouring the composition into a mold of a predetermined shape to form a construction material.

20. The method of claim 19, wherein curing the composition is substantially within a temperature range of 40° C.–400° C.

21. The method of claim 11, further comprising heating the composition while mixing the composition.

22. The method of claim 21, wherein heating the composition occurs at a temperature of at least 50° C.

23. The method of claim 22, wherein heating the composition occurs substantially within a temperature range of 100° C.–300° C.

24. The method of claim 21, further comprising applying the composition to an area having a stability to enhance the stability of the area.

25. The method of claim 11, wherein the structural material is at least one of silt, clay, gravel, soil, sand, bitumen, and concrete.

26. A method for forming a structural composition, comprising:
    (a) mixing a structural material with a vegetable oil to create a composition, wherein the vegetable oil is substantially within a range of 2% and 20% by weight of the structural material;
    (b) heating the composition while mixing the composition;

(c) compacting the composition; and (d) curing the composition.

27. The method of claim 26, wherein the vegetable oil is substantially within a range of 3%–9% by weight of the structural material.

28. The method of claim 26, wherein the vegetable oil is substantially 5% by weight of the structural material.

29. The method of claim 26, wherein the vegetable oil is at least one of rapeseed oil, palm oil, linseed oil, canola oil, soybean oil, sunflower oil, olive oil, and corn oil.

30. The method of claim 26, wherein the vegetable oil is selected from the group consisting of a used vegetable oil and a mixture of used vegetable oils.

31. The method of claim 26, further comprising adding a predetermined amount of a catalyst.

32. The method of claim 31, wherein the catalyst is a metallic catalyst selected from the group consisting of zinc, copper, iron, nickel, zirconium, aluminum, and titanium.

33. The method of claim 32, wherein the catalyst is selected from the group consisting of lime, flyash, and Portland cement.

34. The method of claim 26, wherein mixing a structural material with a vegetable oil to create a composition further comprising adding oil to bitumen and mixing with aggregates.

35. The method of claim 26, wherein mixing a structural material with a vegetable oil to create a composition further comprising adding vegetable oil to an aggregate and mixing with bitumen.

36. A method for forming a structural composition, comprising:

(a) mixing a structural material with a vegetable oil to create a composition, wherein the vegetable oil is substantially within a range of 2% and 20% by weight of the structural material;

(b) adding a predetermined amount of a catalyst to the composition;

(c) compacting the composition; and (d) curing the composition.

37. A method for forming a structural composition, comprising:

(a) mixing a structural material with a vegetable oil to create a composition, wherein the vegetable oil is substantially within a range of 2% and 20% by weight of the structural material;

(b) adding a predetermined amount of a catalyst to the compositions;

(c) heating the composition while mixing the composition;

(d) compacting the composition; and (e) curing the composition.

38. A method for forming a structural composition, comprising:

(a) mixing between 2% and 20% by weight vegetable oil with a structural material to create a composition;

(b) adding a predetermined amount of a catalyst to the composition;

(c) pouring the composition into a mold of a predetermined shape to form a construction material;

(d) compacting the composition; and (e) curing the composition at a temperature range substantially between 40° C.–400° C.

39. A structural composition, comprising:

(a) a polymerized vegetable oil;

(b) a structural material selected from the group consisting of silt, clay, gravel, soil, sand, bitumen, and concrete, wherein the polymerized vegetable oil is substantially within a range of 4%–20% by weight of the structural material; and (c) a catalyst.

40. A composition, comprising:

(a) a polymerized vegetable oil selected from the group consisting of soybean oil, canola oil, sunflower oil, corn oil, and palm oil; and (b) a structural material selected from the group consisting of silt, clay, gravel, soil, sand, bitumen and concrete, or a mixture thereof, wherein the vegetable oil is substantially within a range of about 4% to about 9% of the structural material and wherein the composition exhibits an average strength of from about 1300 psi to about 2600 psi.

41. A method of soil stabilization, comprising:

(a) mixing a structural material with vegetable oil;

(b) heating the mixture to between 50° C. and 200° C.;

(c) spreading the mixture over an area in which stabilized soil is desired;

(d) compacting the mixture; and (e) allowing the compacted mixture to cure.

* * * * *

UNITED STATES PATENT AND TRADEMARK OFFICE
CERTIFICATE OF CORRECTION

PATENT NO. : 6,824,326 B2
DATED : November 30, 2004
INVENTOR(S) : L. Raad

It is certified that error appears in the above-identified patent and that said Letters Patent is hereby corrected as shown below:

Title page,
Item [57], ABSTRACT,
Line 3, after "bitumen," delete "asphalt,".

Column 10,
Lines 18 and 64, "2% and 20%" should read -- 2%—20% --.
Line 31, "from consisting" should read -- from the group consisting --.

Column 11,
Lines 24 and 28, "comprising" should read -- comprises --.
Lines 34 and 45, "2% and 20%" should read -- 2%—20% --.
Line 48, "compositions;" should read -- composition; --.

Signed and Sealed this

Twenty-fifth Day of October, 2005

JON W. DUDAS
*Director of the United States Patent and Trademark Office*